No. 813,242. PATENTED FEB. 20, 1906.
H. SEEGER.
NUT LOCK.
APPLICATION FILED SEPT. 30, 1904.
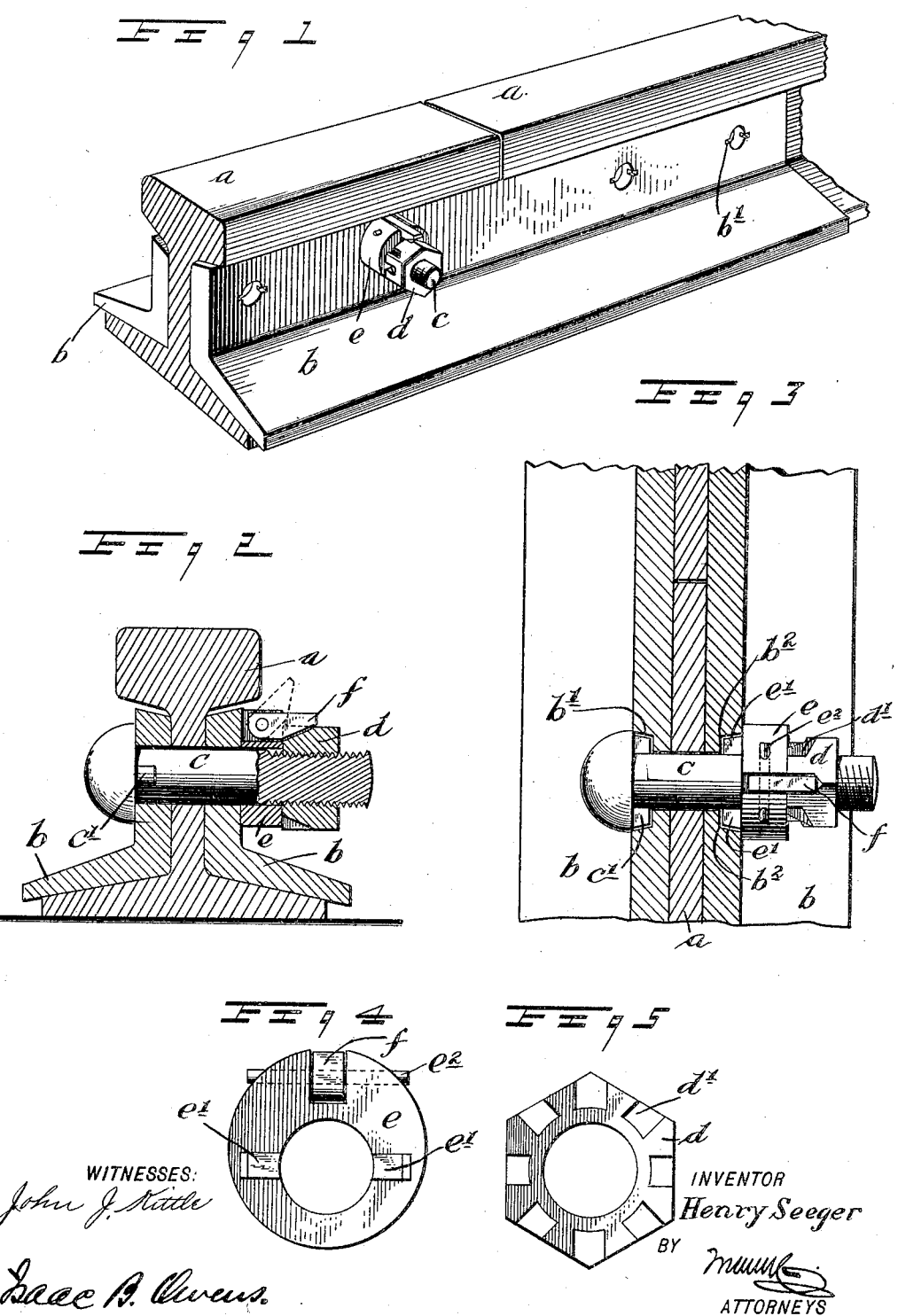
WITNESSES:
INVENTOR
Henry Seeger
BY
ATTORNEYS

UNITED STATES PATENT OFFICE.

HENRY SEEGER, OF MORLEY, IOWA.

NUT-LOCK.

No. 813,242.　　　　Specification of Letters Patent.　　　Patented Feb. 20, 1906.

Application filed September 30, 1904. Serial No. 226,658.

*To all whom it may concern:*

Be it known that I, HENRY SEEGER, a citizen of the United States, and a resident of Morley, in the county of Jones and State of Iowa, have invented a new and Improved Nut-Lock, of which the following is a full, clear, and exact description.

This invention relates to a nut-lock designed especially for railway-work, but useful in various other connections.

It comprises, as will be fully set forth hereinafter and pointed out in the claim, the arrangement with a bolt and a shouldered nut of a washer or collar adapted to surround the bolt inside of the nut and carrying a peculiar dog coacting with the shoulder or shoulders of the nut securely to lock the same.

Reference is had to the drawings forming a part of this specification and illustrating as an example the preferred embodiment of my invention, in which drawings like letters of reference indicate like parts in the several views, and in which—

Figure 1 is a perspective view of a rail-joint, showing my invention applied. Fig. 2 is an enlarged cross-section of the joint and also illustrating in section the nut and washer and part of the bolt. Fig. 3 is a horizontal section of the joint, showing the bolt and its attachment in place. Fig. 4 is a still further enlarged inner end elevation of the washer, and Fig. 5 is a still further enlarged inner end elevation of the nut.

In Figs. 1, 2, and 3, $a$ indicates the rail-sections, and $b$ the fish-plates, which are fully known in the prior art.

$c$ indicates the bolt, which is passed through the fish-plates and web of the rail.

$d$ indicates the nut, and $e$ the collar or washer.

The bolt is threaded at its end and is formed adjacent to its head with two or any desired number of lugs $c'$, the adjacent fish-plate having cavities $b'$, designed to receive said lugs, thus holding the bolt from turning movement in the rail and fish-plate independently of the nut. The washer $e$ is formed on its inner end with lugs $e'$, similar to the lugs $c'$, adapted to enter cavities $b^2$ in the fish-plates, so as to hold the washer against turning movement the same as before explained with respect to the bolt. The nut has a number of notches $d'$, forming the before-referred-to shoulders, these notches being formed in the sides of the nut and being adapted to receive the free end of a dog $f$, which is pivoted by a pin $e^2$ on the collar $e$, so that the dog may swing up in the position indicated by broken lines in Fig. 2 or downward into the active position indicated by full lines in the said view. The dog is of a width greater than the depth of the notches, so that it can be readily engaged when in a notch to lift it out of the same.

In assembling the parts of the device the collar or washer $e$ is placed around the bolt against the adjacent fish-plates and the dog $f$ is thrown up into inactive position. The nut is then screwed on the bolt and brought to the proper degree of tightness, whereupon the dog is thrown down to engage one of the aforesaid shoulders on the nut, thus locking the nut in place. It will be seen that this provides a most secure means for holding the dog against turning movement. Preferably the dog is friction-tight on the collar, and thus the necessity for friction-springs is avoided. It will also be observed that the device will not suffer from exposure to the weather. On the contrary, even should the dog rust this will tend to hold it more securely, and when it is desired to remove the nut a suitable instrument may be readily inserted under the dog to lift the same, notwithstanding that it may have rusted into position. The lugs $c'$ and $e'$ also serve to increase the efficiency of the device as a whole, preventing idle turning of the bolt, and also holding the collar, so that it will prove effective in operation.

Various changes in the form, proportions, and minor details of my invention may be resorted to at will without departing from the spirit and scope thereof. Hence I consider myself entitled to all such variations as may lie within the terms of my claim.

Having thus described my invention, I claim as new and desire to secure by Letters Patent—

The combination of a bolt, a collar on the bolt and provided with lugs on its inner face for entering cavities in a part through which the bolt passes, a nut on the bolt and provided in the exterior of its body with a plurality of notches, said notches extending out through the inner end of the nut and having their bottom walls beveled downwardly and inwardly, and a dog pivoted to the washer and having its under face at the outer end beveled upwardly and outwardly, said dog being adapted to enter one of the recesses of the nut to lock the same, substantially as herein shown and described.

In testimony whereof I have signed my name to this specification in the presence of two subscribing witnesses.

HENRY SEEGER.

Witnesses:
O. A. DAYTON,
JEM JEFTEN.